US010919438B2

(12) United States Patent
Iriba

(10) Patent No.: US 10,919,438 B2
(45) Date of Patent: Feb. 16, 2021

(54) VEHICLE LAMP SYSTEM, VEHICLE LAMP CONTROL DEVICE AND VEHICLE LAMP CONTROL METHOD

(71) Applicant: KOITO MANUFACTURING CO., LTD., Tokyo (JP)

(72) Inventor: Takehito Iriba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/727,473

(22) Filed: Dec. 26, 2019

(65) Prior Publication Data

US 2020/0207254 A1 Jul. 2, 2020

(30) Foreign Application Priority Data

Dec. 26, 2018 (JP) ................. 2018-242511

(51) Int. Cl.
*H05B 45/37* (2020.01)
*H05B 33/14* (2006.01)
*H05B 45/48* (2020.01)
*B60Q 1/14* (2006.01)
*F21S 41/657* (2018.01)
*F21V 23/04* (2006.01)

(52) U.S. Cl.
CPC .......... *B60Q 1/1423* (2013.01); *F21S 41/657* (2018.01); *F21V 23/0464* (2013.01)

(58) Field of Classification Search
CPC ................ B60Q 2300/41; B60Q 2300/42; B60Q 1/143; B60Q 2300/056; B60Q 1/1423; B60Q 1/085; B60Q 2300/054; B60Q 2300/112; B60Q 1/12; B60Q 2300/122

USPC ......................................... 315/82, 209 R, 236
See application file for complete search history.

(56) References Cited

U.S. PATENT DOCUMENTS

| 2009/0237008 A1* | 9/2009 | Noguchi ................ B60Q 1/143 |
| | | 315/297 |
| 2013/0169155 A1* | 7/2013 | Nakashima ............ B60Q 1/14 |
| | | 315/82 |
| 2013/0258689 A1* | 10/2013 | Takahira ............... F21S 41/176 |
| | | 362/465 |
| 2018/0370424 A1* | 12/2018 | Mayer ..................... B60Q 1/46 |

FOREIGN PATENT DOCUMENTS

JP 2012-88224 A 5/2012

* cited by examiner

*Primary Examiner* — Wei (Victor) Y Chan
(74) *Attorney, Agent, or Firm* — Osha Bergman Watanabe & Burton LLP

(57) ABSTRACT

A vehicle lamp system includes an imaging unit, a luminance analysis unit, an illuminance setting unit, a light source unit and a light source control unit. The light source control unit controls the light source unit to periodically form a reference light distribution pattern including at least a part of a fixed illuminance area which does not depend on the illuminance value determined by the illuminance setting unit. The illuminance setting unit determines the illuminance value based on a reference detection result including the detection result of the luminance analysis unit obtained under the formation of the reference light distribution pattern, and updates the illuminance value when the new reference detection result is obtained.

6 Claims, 6 Drawing Sheets

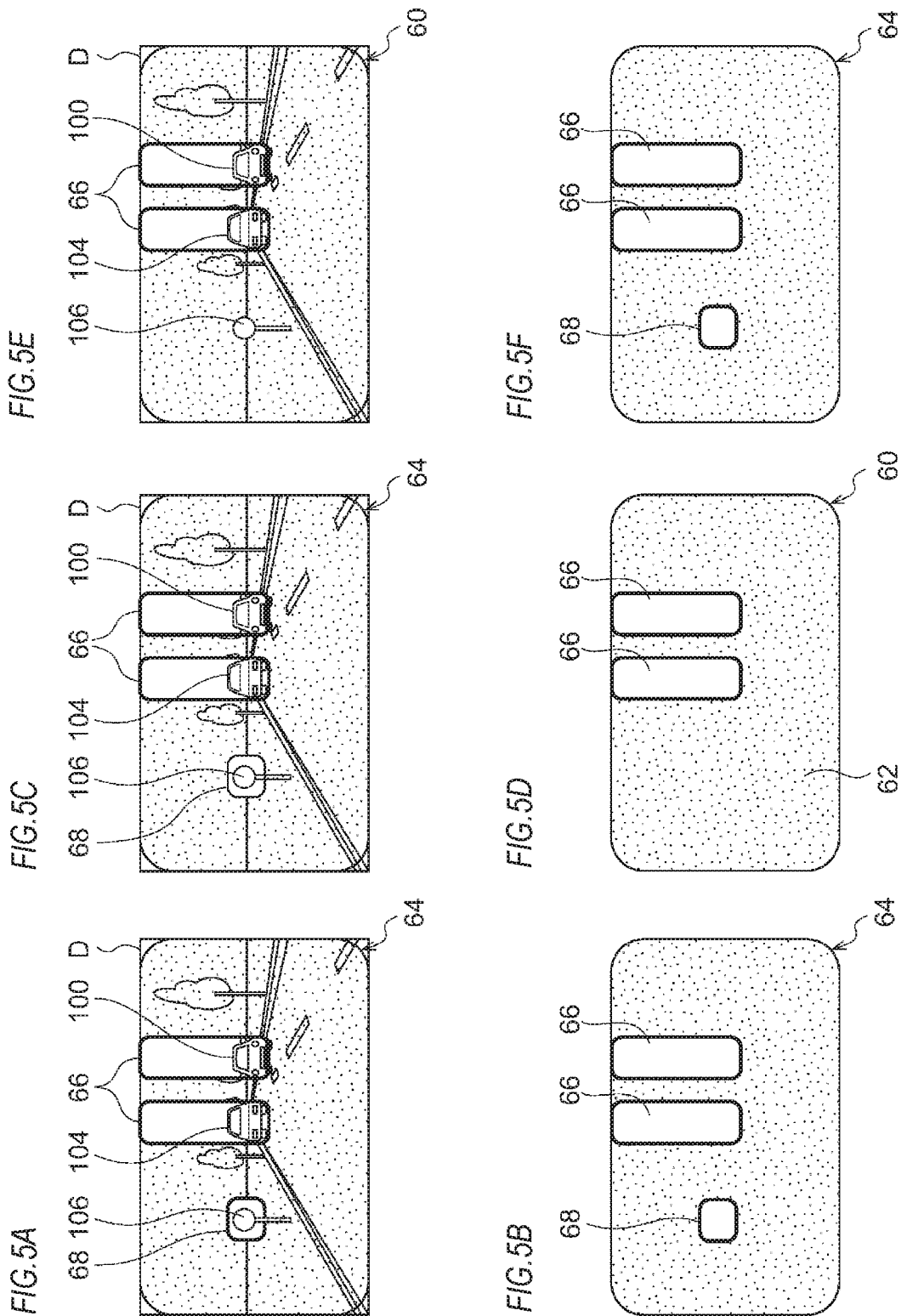

VEHICLE LAMP SYSTEM, VEHICLE LAMP CONTROL DEVICE AND VEHICLE LAMP CONTROL METHOD

CROSS-REFERENCE TO RELATED APPLICATIONS

The present application claims priority from Japanese Patent Application No. 2018-242511, filed on Dec. 26, 2018, the entire content of which is incorporated herein by reference.

TECHNICAL FIELD

The present invention relates to a vehicle lamp system, a vehicle lamp control device, and a vehicle lamp control method, and particularly relates to a vehicle lamp system, a vehicle lamp control device, and a vehicle lamp control method which are used in an automobile or the like.

BACKGROUND ART

In a related art, there has been proposed an Adaptive Driving Beam (ADB) control which dynamically and adaptively controls a light distribution pattern of a high beam based on conditions surrounding a vehicle. The ADB control is to detect, by a camera, presence or absence of a target to be avoided of being irradiated with high luminance light, that is the ADB control is to detect a dimming target located in front of a host vehicle, and to dim or turn off the light with which an area corresponding to the dimming target is irradiated (for example see N-A-2012-088224).

Examples of the dimming target include a front vehicle which is a preceding vehicle, an oncoming vehicle, or the like. It is possible to reduce glare to be given to a driver of the front vehicle by dimming or turning off the light with which an area corresponding to the front vehicle is irradiated. Examples of the dimming target further include a reflection object with high reflectance which is a visual line guiding sign (a delineator), a signboard, a road sign, or the like on a roadside. It is possible to reduce glare to be received by a driver of the host vehicle due to light reflected by the reflection object by dimming light with which an area corresponding to the reflection object is irradiated. In particular, in recent years, there is a tendency to increase luminance of a vehicle lamp and increase intensity of light reflected by the reflection object, so that a measure against glare caused by the reflection object is required.

SUMMARY

In the related-art ADB control, under formation of a light distribution pattern by a lamp of the host vehicle, a side in front of the host vehicle is imaged by the camera to detect the dimming target, and a new light distribution pattern is determined based on a detection result. That is, the light distribution pattern formed by the host vehicle is a so-called closed loop control which affects determination of a light distribution pattern to be formed next.

In the control of determining the light distribution pattern based on an imaging result of the camera, it is desirable that a deviation between an angle of view of the camera and a light emission angle of the lamp is small such that the light distribution pattern is formed at a correct position in accordance with conditions in front of the host vehicle. As a result of intensive studies on an influence of the deviation between the angle of view of the camera and the light emission angle of the lamp in the closed loop control of the ADB. The present inventor has found that the light distribution pattern to be formed and the light distribution pattern actually formed in accordance with the conditions in front of the vehicle may gradually diverge, and a formation accuracy of the light distribution pattern may gradually decrease. Accordingly, the present inventor has recognized that it is necessary to cause the angle of view of the camera and the light emission angle of the lamp to be coincide with each other with higher accuracy than that has been recognized so far.

However, if the angle of view of the camera and the light emission angle of the lamp are caused to coincide with each other with high accuracy, a structure for increasing a positioning accuracy of the camera or the lamp may be required, or an installation location may be limited. It is also conceivable to correct the deviation between the angle of view of the camera and the light emission angle of the lamp by performing calculation processing that has taken the deviation between the two into account. But in this case, the calculation processing becomes complicated.

The present invention has been made in view of the above circumstances. An aspect of the present invention provides a technique for maintaining a formation accuracy of a light distribution pattern while reducing complication of a configuration of a vehicle lamp system.

In order to solve the above-described problems, an aspect of the present invention provides a vehicle lamp system. A vehicle lamp system includes:

an imaging unit configured to image a front side of a host vehicle;

a luminance analysis unit configured to detect, based on information obtained from the imaging unit, luminance of each of a plurality of individual areas arranged in front of the host vehicle;

an illuminance setting unit configured to determine, based on a detection result of the luminance analysis unit, an illuminance value of light with which each individual area is irradiated;

a light source unit capable of independently adjusting illuminance of the light with which each of the plurality of individual areas is irradiated; and a light source control unit configured to control the light source unit based on the illuminance value determined by the illuminance setting unit.

The light source control unit controls the light source unit to periodically form a reference light distribution pattern including at least a part of a fixed illuminance area which does not depend on the illuminance value determined by the illuminance setting unit.

The illuminance setting unit determines the illuminance value based on a reference detection result including the detection result of the luminance analysis unit obtained under the formation of the reference light distribution pattern, and updates the illuminance value when the new reference detection result is obtained.

According to this aspect, it is possible to maintain the formation accuracy of the light distribution pattern while reducing the complication of the configuration of the vehicle lamp system.

The vehicle lamp system according to the above aspect of the present invention, the fixed illuminance area may include any one of at least a part of a low beam light distribution pattern and at least a part of a high beam light distribution pattern. The vehicle lamp system according to the one of the above aspect of the present invention, may further include:

a target analysis unit configured to detect, based on the information obtained from the imaging unit, a predetermined target which is present in front of the host vehicle. The illuminance setting unit may determine a specific illuminance value for a specific individual area determined in accordance with a position where the target is present. The reference light distribution pattern may include a specific illuminance area formed of the specific illuminance value.

Another aspect of the present invention provides a control device of a vehicle lamp. The control device includes:

a luminance analysis unit configured to detect, based on information obtained from an imaging unit configured to image a front side of a host vehicle, luminance of each of a plurality of individual areas arranged in front of the host vehicle;

an illuminance setting unit configured to determine, based on a detection result of the luminance analysis unit, an illuminance value of light with which each individual area is irradiated; and a light source control unit configured to control a light source unit capable of independently adjusting, based on the illuminance value determined by the illuminance setting unit, illuminance of the light with which each individual area is irradiated.

The light source control unit controls the light source unit to periodically form a reference light distribution pattern including at least a part of a fixed illuminance area which does not depend on the illuminance value determined by the illuminance setting unit.

The illuminance setting unit determines the illuminance value based on a reference detection result including the detection result of the luminance analysis unit obtained under the formation of the reference light distribution pattern, and updates the illuminance value when the new reference detection result is obtained.

Another aspect of the present invention provides a control method of a vehicle lamp. The control method includes:

a luminance detecting step of detecting, based on information obtained from an imaging unit configured to image a front side of a host vehicle, luminance of each of a plurality of individual areas arranged in front of the host vehicle;

an illuminance setting step of determining, based on the detected luminance, an illuminance value of light with which each individual area is irradiated; and a light source control step of controlling a light source unit capable of independently adjusting, based on the determined illuminance value, illuminance of the light with which each individual area is irradiated.

The control method further includes a step of periodically forming a reference light distribution pattern including at least a part of a fixed illuminance area which does not depend on the illuminance value determined in the illuminance setting step.

In the illuminance setting step, the illuminance value is determined based on a reference detection result including the detection result of the luminance detecting step obtained under the formation of the reference light distribution pattern, and the illuminance value is updated when the new reference detection result is obtained.

Any combinations of the above-described constituting elements, and implementations of the present invention in form of methods, devices, systems, and the like are also effective as aspects of the present invention.

According to the present invention, it is possible to maintain the formation accuracy of the light distribution pattern while reducing the complication of the configuration of the vehicle lamp system.

BRIEF DESCRIPTION OF DRAWINGS

FIGS. 5A to 5F are schematic views illustrating an ADB control executed by the vehicle lamp system.

DETAILED DESCRIPTION OF EMBODIMENTS

Figure 1:
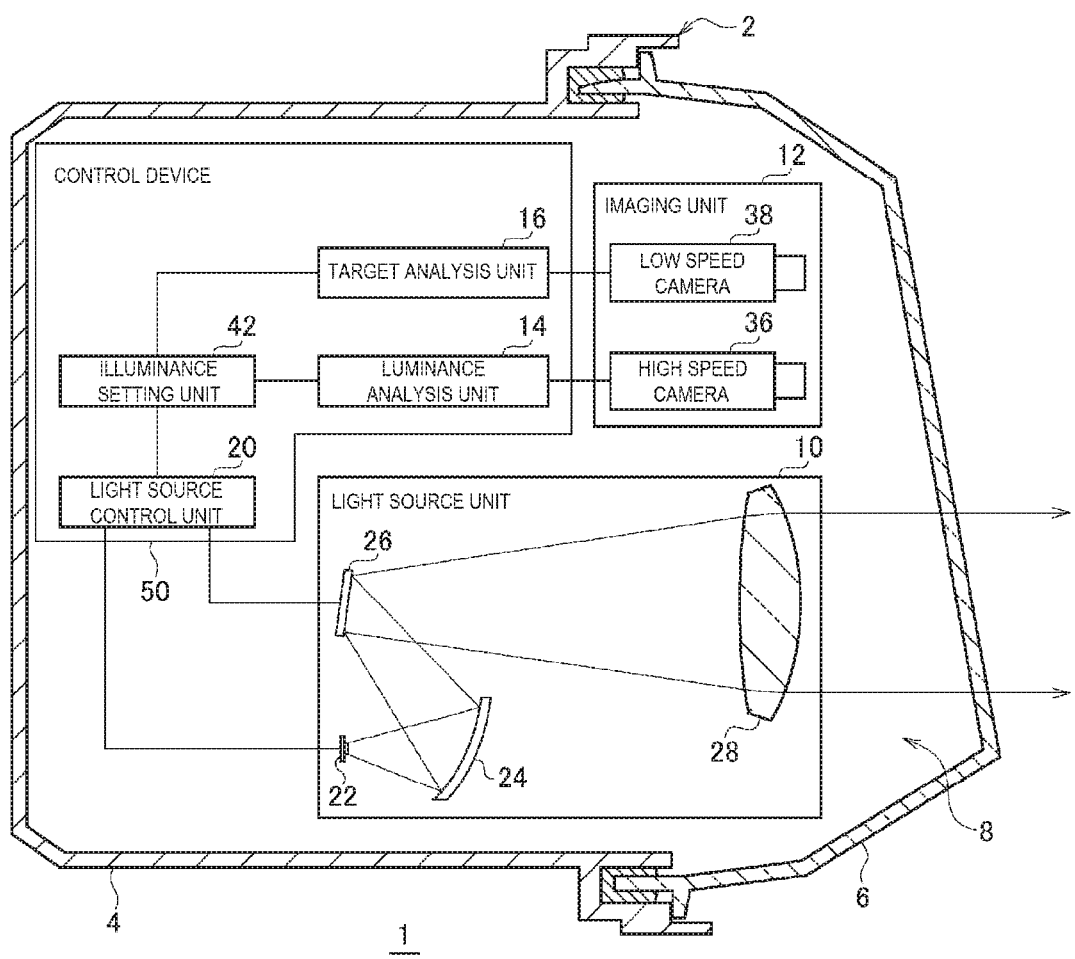
FIG. 1 illustrates a schematic configuration of a vehicle lamp system according to an embodiment.

Hereinafter, the present invention will be described based on a preferred embodiment with reference to the drawings. The embodiment is not intended to limit the invention and is merely for illustration, and all the features and combinations thereof described in the embodiment are not necessarily essential to the invention. The same or equivalent components, members, and processing shown in the drawings are denoted by the same reference numerals, and a repetitive description thereof will be omitted. Scale and shape of each part shown in each of the drawings are set for convenience to simplify the description, and are not to be interpreted as limitations unless otherwise specified. When terms "first", "second" and the like are used in the present specification or claims, the terms are not intended to represent any order or importance, and are intended to distinguish one configuration from another unless otherwise specified. Some of members that are not important for describing the embodiment in the drawings are shown to be omitted.

FIG. 1 illustrates a schematic configuration of a vehicle lamp system according to the embodiment. In FIG. 1, parts of components of a vehicle lamp system 1 are depicted as functional blocks. These functional blocks are implemented by elements and circuits including a CPU and a memory of a computer which are a hardware configuration, and are implemented by a computer program or the like which is a software configuration. Those skilled in the art would have understood that these functional blocks can be implemented in various forms by a combination of hardware and software.

The vehicle lamp system 1 is applied to a vehicle headlamp apparatus including a pair of headlamp units provided on left and right sides in the front of a vehicle. The pair of headlamp units have substantially the same configuration except that the pair of headlamp units have a bilaterally symmetrical structure, so that FIG. 1 illustrates a structure of one headlamp unit as a vehicle lamp 2.

The vehicle lamp 2 provided in the vehicle lamp system 1 includes a lamp body 4 including an opening on a front side of the vehicle, and a translucent cover 6 attached so as to cover the opening of the lamp body 4. The translucent cover 6 is formed of a translucent resin, glass, or the like. A light source unit 10, an imaging unit 12, and a control device 50 are housed in a lamp chamber 8 formed by the lamp body 4 and the translucent cover 6.

The light source unit 10 is a device capable of independently adjusting illuminance (intensity) of light with which each of a plurality of individual areas (see FIG. 3) arranged in front of a host vehicle is irradiated. The light source unit 10 includes a light source 22, a reflection optical member 24, the light deflection device 26, and a projection optical member 28. Each part is attached to the lamp body 4 by a support mechanism (not illustrated).

The light source 22 may be a semiconductor light emitting element which is a Light Emitting Diode (LED), a Laser Diode (LD), an Electroluminecence (EL) element, or the like, a light bulb, an incandescent lamp (a halogen lamp), a discharge lamp, or the like.

The reflection optical member 24 is configured to guide light emitted from the light source 22 to a reflection surface of the light deflection device 26. The reflection optical member 24 includes a reflection mirror whose inner surface is a predetermined reflection surface. The reflection optical member 24 may be a solid light guide or the like. If the light emitted from the light source 22 can be directly guided to the light deflection device 26, the reflective optical member 24 may not be provided.

Figure 2A:
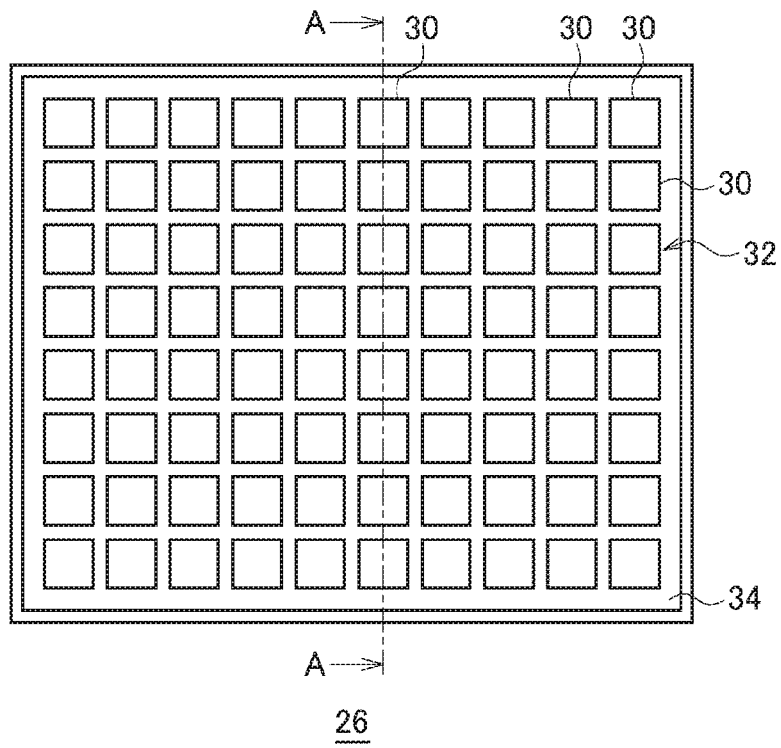
FIG. 2A is a front view showing a schematic configuration of a light deflection device 26.
Figure 2B:
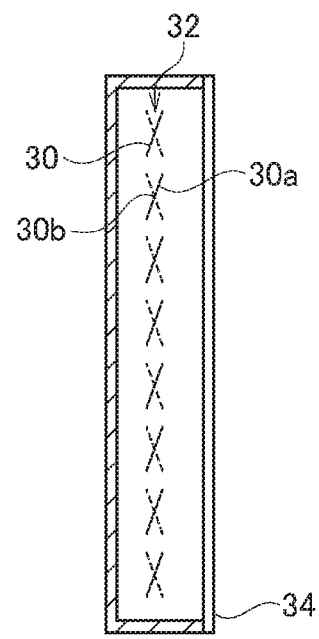
FIG. 2B is a cross-sectional view taken along a line A-A of the light deflection device shown in FIG. 2A.

The light deflection device 26 is provided on an optical axis of the projection optical member 28, and is configured to selectively reflect the light emitted from the light source 22 to the projection optical member 28. The light deflection device 26 is, for example, a Digital Mirror Device (DMD). That is, the light deflection device 26 is formed by arranging a plurality of micromirrors in an array (a matrix). A reflection direction of the light emitted from the light source 22 can be selectively changed by controlling angles of reflection surfaces of the plurality of micromirrors respectively. That is, the light deflection device 26 can reflect a part of the light emitted from the light source 22 toward the projection optical member 28 and reflect other of the light in a direction in which the light is not effectively used by the projection optical member 28. Here, the direction in which the light is not effectively used can be regarded as, for example, a direction in which the light is incident on the projection optical member 28 but hardly contributes to formation of a light distribution pattern, or a direction toward a light absorption member (a light shielding member) (not illustrated), FIG. 2A is a front view showing a schematic configuration of the light deflection device 26. FIG. 2B is a cross-sectional view taken along a line A-A of the light deflection device shown in FIG. 2A. The light deflection device 26 includes a micromirror array 32 in which a plurality of micro mirror elements 30 are arranged in a matrix, and a transparent cover member 34 provided on a front side (on a right side of the light deflection device 26 shown in FIG. 2B) of a reflection surface 30a of each mirror element 30. The cover member 34 is formed of, for example, glass or plastic.

The mirror element 30 has a substantially square shape, and includes a rotation shaft 30b which extends in a horizontal direction and substantially equally divides the mirror element 30. Each mirror element 30 of the micromirror array 32 is configured to be switchable between a first reflection position (a position indicated by a solid line in FIG. 2B) and a second reflection position (a position indicated by a dotted line in FIG. 2B). At the first reflection position, the light emitted from the light source 22 is reflected toward the projection optical member 28 so as to be used as a part of a desired light distribution pattern. At the second reflection position, the light emitted from the light source 22 is reflected so as to be not effectively used. Each mirror element 30 rotates around the rotation shaft 30b and is individually switched between the first reflection position and the second reflection position. Each mirror element 30 takes the first reflection position when turned on and takes the second reflection position when turned off.

Figure 3:
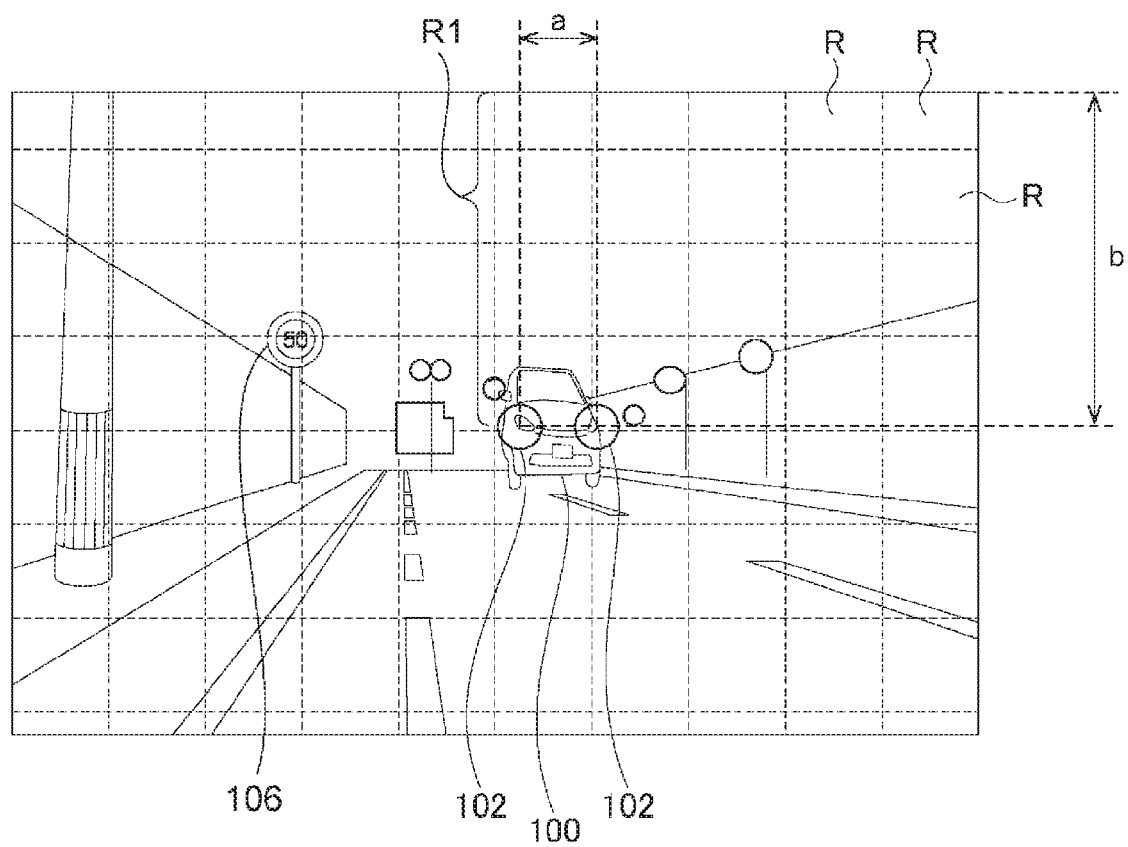
FIG. 3 schematically illustrates a state in front of the host vehicle.

FIG. 3 schematically illustrates a state in front of the host vehicle. As described above, the light source unit 10 includes the plurality of mirror elements 30 as individual irradiation units capable of irradiating with light independently of each other toward a front of the lamp. The light source unit 10 can irradiate a plurality of individual areas R arranged in front of the host vehicle with light by the mirror elements 30. Each individual area R corresponds to one pixel or a set of a plurality of pixels of the imaging unit 12, more specifically, for example, one pixel or a set of a plurality of pixels of a high speed camera 36. In the present embodiment, each individual area R and each mirror element 30 are associated with each other.

In FIGS. 2A and 3, for convenience of explanation, the mirror elements 30 and the individual areas R are arranged in a horizontal 10×vertical 8 array, but the numbers of the mirror elements 30 and the individual areas R are not particularly limited. For example, resolution of the micromirror array 32 (in other words, the numbers of the mirror elements 30 and the individual areas R) are from 1,000 pixels to 300,000 pixels. Time required for the light source unit 10 to form one light distribution pattern is, for example, 0.1 ms to 5 ms. That is, the light source unit 10 can change the light distribution pattern every 0.1 ms to 5 ms.

As illustrated in FIG. 1, the projection optical member 28 is formed of, for example, a free-form surface lens including a front side surface and a rear side surface having a free-form surface shape. The projection optical member 28 projects a light source image, which is formed on a rear focal plane including a rear focal point thereof, forward of the lamp as a reverse image. The projection optical member 28 is provided such that the rear focal point thereof is located on an optical axis of the vehicle lamp 2 and in a vicinity of a reflection surface of the micromirror array 32. The projection optical member 28 may be a reflector.

The light emitted from the light source 22 is reflected by the reflection optical member 24, and the micromirror array 32 of the light deflection device 26 is irradiated with the light. The light deflection device 26 reflects the light toward the projection optical member 28 by a predetermined mirror element 30 at the first reflection position. The reflected light passes through the projection optical member 28 and travels forward of the lamp, and each individual area R corresponding to each mirror element 30 is irradiated with the reflected light. Accordingly, a light distribution pattern having a predetermined shape is formed forward of the lamp.

The imaging unit 12 is configured to image a front side of the host vehicle. The imaging unit 12 includes the high speed camera 36 and the low speed camera 38. The high speed camera 36 has a relatively high frame rate, for example, 200 fps to 10,000 fps (0.1 ms to 5 ms per frame). On the other hand, the low speed camera 38 has a relatively low frame rate, for example, 30 fps to 120 fps (approximately 8 ms to 33 ms per frame). The high speed camera 36 has relatively small resolution, for example, 300,000 pixels or more and 5,000,000 pixels or less. On the other hand, the low speed camera 38 has relatively large resolution, for example, 5,000,000 pixels or more. The high speed camera 36 and the low speed camera 38 image all the individual areas R. The resolution of the high speed camera 36 and the low speed camera 38 is not limited to the above-described numerical value, and can be set to any value within a technically consistent range.

The control device 50 includes a luminance analysis unit 14, a target analysis unit 16, an illuminance setting unit 42, and a light source control unit 20. Image data acquired by the imaging unit 12 is sent to the luminance analysis unit 14 and the target analysis unit 16. Basic operation of each unit provided in the control device 50 will be described below. Each unit operates by executing a program stored in a memory by an integrated circuit that forms each unit.

The luminance analysis unit 14 is configured to detect luminance of each individual area R based on information (image data) obtained from the imaging unit 12. The luminance analysis unit 14 is a high-speed and low-precision analysis unit configured to perform image analysis with lower accuracy than the target analysis unit 16 and to output an analysis result at high speed. The luminance analysis unit 14 according to the present embodiment is configured to detect, based on information obtained from the high speed camera 36, the luminance of each individual area R. The luminance analysis unit 14 can detect the luminance of each individual area R, for example, every 0.1 ms to 5 ms. A detection result of the luminance analysis unit 14, that is, a signal indicating luminance information of the individual area. R is transmitted to the illuminance setting unit 42.

The target analysis unit 16 is configured to detect, based on the information obtained from the imaging unit 12, a predetermined target which is present in front of the host vehicle. The target analysis unit 16 is a low-speed and high-precision analysis unit configured to perform image analysis with higher accuracy than the luminance analysis unit 14 and to output an analysis result at low speed. The target analysis unit 16 according to the present embodiment detects the target based on information obtained from the low speed camera 38. The target analyzing unit 16 can detect the target, for example, every 50 ms. The target detected by the target analyzing unit 16 is, for example a self-luminous body, and specific examples thereof include an oncoming vehicle 100 illustrated in FIG. 3 and a preceding vehicle 104 (see FIG. 4C).

The target analysis unit 16 can detect the target using known methods including algorithm recognition, deep learning, and the like. For example, the target analysis unit 16 stores feature points indicating the oncoming vehicle 100 in advance. When there is data including feature points indicating the oncoming vehicle 100 in imaging data of the low speed camera 38, the target analyzing unit 16 recognizes a position of the oncoming vehicle 100. The "feature points indicating the oncoming vehicle 100" are, for example, light spots 102 (see FIG. 3) having a predetermined luminosity or higher appearing in an estimated presence area of headlamps of the oncoming vehicle 100. A detection result of the target analysis unit 16, that is, a signal indicating information of the target in front of the host vehicle is transmitted to the illuminance setting unit 42.

The illuminance setting unit 42 performs setting of a specific individual area R1, and setting of an illuminance value of the light with which each individual area R is irradiated, and the like based on the detection results of the luminance analysis unit 14 and the target analysis unit 16. First, the illuminance setting unit 42 determines the specific individual area R1 (see FIG. 3) in accordance with a position where the target is present. For example, when the target is the oncoming vehicle 100. The illuminance setting unit 42 determines the specific individual area R1 based on position information of the oncoming vehicle 100 included in the detection result of the target analysis unit 16.

In terms of the setting of the specific individual area R1, for example, the illuminance setting unit 42 determines a vertical distance b of a predetermined ratio with respect to a horizontal distance a between the two light spots 102 corresponding to the headlamps of the oncoming vehicle 100, and sets the individual area R overlapping a dimension range of the horizontal a×the vertical b as the specific individual area R1 (see FIG. 3). The specific individual area R1 includes the individual area R overlapping a driver of the oncoming vehicle 100. In the present embodiment, the individual area R including the light spots 102 and the individual area R located above the individual area R in a vertical direction are all determined as the specific individual area R1.

Then, the illuminance setting unit 42 determines the illuminance value of the light with which each individual area R including the specific individual area R1 is irradiated. For example, the illuminance setting unit 42 stores a predetermined target luminance value in the memory for the individual area R excluding the specific individual area R1. As an example, the illuminance setting unit 42 stores the target luminance value of the same value for the individual area R excluding the specific individual area R1. The illuminance setting unit 42 is configured to set the illuminance value of each individual area R such that the luminance detected by the luminance analysis unit 14 approaches the target luminance value by subsequent light distribution pattern formation.

The illuminance setting unit 42 is configured to determine a specific illuminance value for the specific individual area R1. When the target is the oncoming vehicle 100 or the preceding vehicle 104, the illuminance setting unit 42 sets, for example, a specific illuminance value "0" for the specific individual area R1. That is, the illuminance setting unit 42 determines a light distribution pattern in which the specific individual area R1 is shielded. The illuminance setting unit 42 transmits a signal indicating the illuminance value of each individual area R including the specific illuminance value for the specific individual area R1 to the light source control unit 20.

The light source control unit 20 is configured to control the light source unit 10 based on the illuminance value determined by the illuminance setting unit 42. The light source control unit 20 controls turning on and off of the light source 22 and on and off switching of each mirror element 30. The light source control unit 20 adjusts an on time ratio (a width and a density) of each mirror element 30 based on the illuminance value of the light with which each individual area R is irradiated. Accordingly, the illuminance of the light with which each individual area R is irradiated can be adjusted.

With the above-described configuration, the vehicle lamp system 1 can form a light distribution pattern formed by gathering a plurality of partial irradiation areas. Each of the plurality of partial irradiation areas is formed when the corresponding mirror element 30 is on. The vehicle lamp system 1 can form light distribution patterns of various shapes by switching each mirror element 30 on and off.

An Adaptive Driving Beam (ADB) control executed by the vehicle lamp system 1 according to the present embodiment will be described below. FIGS. 4A to 4F and FIGS. 5A to 5F are schematic views illustrating the ADB control executed by the vehicle lamp system. FIGS. 4A, 4C, 4E, 5A, 5C, and 5E are image data obtained by the imaging unit 12. FIGS. 4B, 4D, 4F, 5B, 5D, and 5F are the light distribution patterns formed by the light source unit 10.

Figure 4A:
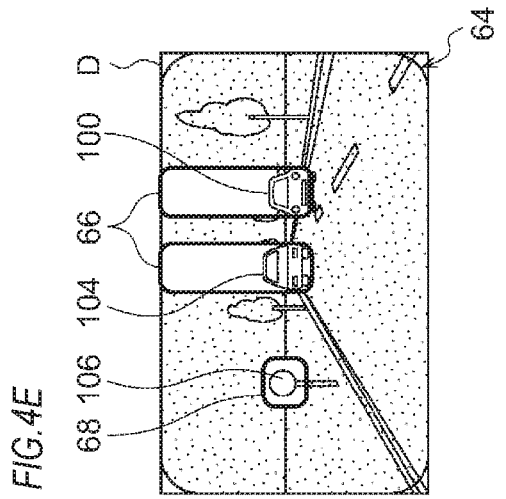
FIGS. 4A to 4F are schematic views illustrating an ADB control executed by the vehicle lamp system.

First, as an example, no light distribution pattern is formed by the vehicle lamp system 1 before a start of the ADB control as illustrated in FIG. 4A. When the ADB control is started, as illustrated in FIG. 4B, the light source control unit 20 controls the light source unit 10 to form a reference light distribution pattern 60. The reference light distribution pattern 60 includes at least a part of a fixed illuminance area 62 which does not depend on the illuminance value determined by the illuminance setting unit 42. The reference light distribution pattern 60 initially formed in the ADB control entirely includes the fixed illuminance area 62.

The fixed illuminance area 62 includes a light distribution pattern selected by the driver or selected by the vehicle lamp system 1 in accordance with a traveling environment of the host vehicle before the start of the ADB control. Specifically, the fixed illuminance area 62 includes any one of at least a part of a low beam light distribution pattern and at least a part of a high beam light distribution pattern.

For example, if the host vehicle is traveling in an urban area, the low beam light distribution pattern is more likely to be selected as a light distribution pattern to be formed while the ADB control is not executed. In this case, the reference light distribution pattern 60 formed in the ADB control includes the fixed illuminance area 62 based on the low beam light distribution pattern. If the host vehicle is traveling in a suburban area, the high beam light distribution pattern is more likely to be selected as the light distribution pattern to be formed while the ADB control is not executed. In this case, the reference light distribution pattern 60 formed in the ADB control includes the fixed illuminance area 62 based on the high beam light distribution pattern. FIG. 4B illustrates the fixed illuminance area 62 including the entire high beam light distribution pattern.

Figure 4C:
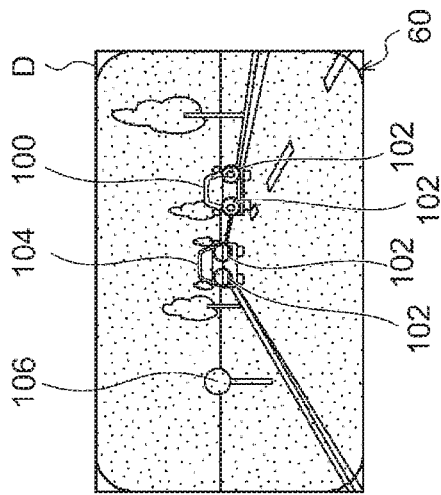

Subsequently, as illustrated in FIG. 4C, under formation of the reference light distribution pattern 60, the front side of the host vehicle is imaged by the imaging unit 12, and image data D is obtained. As an example, the image data D includes the oncoming vehicle 100, the preceding vehicle 104, and a road sign 106. The luminance analysis unit 14 detects the luminance of each individual area R based on the image data D. In the detection result, the light spots 102 derived from the head lamps of the oncoming vehicle 100 or tail lamps of the preceding vehicle 104 are detected as a high luminance body. The road sign 106 is a reflection object with high reflectance. Therefore, the road sign 106 is also detected as a high luminance body similarly to the light spots 102 of the oncoming vehicle 100 and the preceding vehicle 104.

The target analysis unit 16 detects the oncoming vehicle 100 and the preceding vehicle 104 as the predetermined target from the light spots 102 included in the image data D obtained under the formation of the reference light distribution pattern 60. The detection results of the luminance analysis unit 14 and the target analysis unit 16, which are obtained under the formation of the reference light distribution pattern 60, are referred to as a reference detection result below.

Figure 4E:
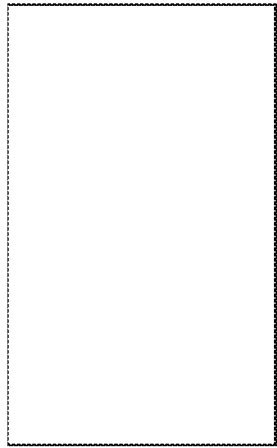
Figure 4B:
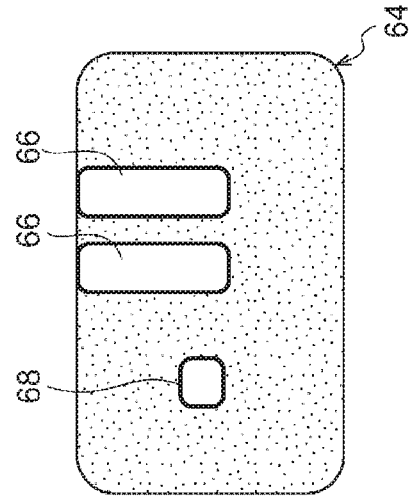
Figure 4D:
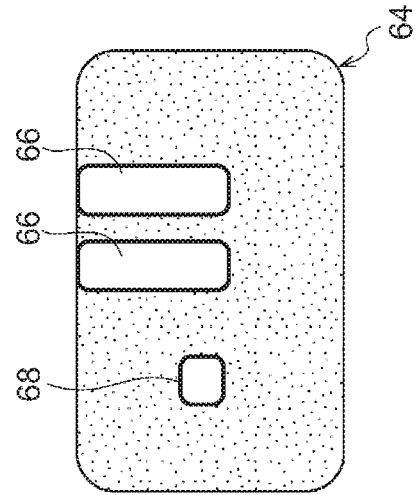

Subsequently, as illustrated in FIG. 4D, the illuminance setting unit 42 determines the illuminance value of each individual area R based on the reference detection result. As a result, an ADB light distribution pattern 64 is determined. Then, the light source control unit 20 controls the light source unit 10 to form the determined ADB light distribution pattern 64.

As described above, the illuminance setting unit 42 determines the specific individual area R1 corresponding to the oncoming vehicle 100 and the preceding vehicle 104 which are specified by the target analysis unit 16. Then, the specific illuminance value "0" is set for the specific individual area R1. Therefore, the ADB light distribution pattern 64 includes a specific illuminance area 66 formed of the specific illuminance value. The specific illuminance area 66 according to the present embodiment is a light shielding area.

The illuminance setting unit 42 determines the illuminance value such that a luminance difference of each individual area R with other individual areas R decreases under the formation of the light distribution pattern to be formed later. At this time, the road sign 106 is a high luminance body, so that an illuminance value lower than that of other individual areas R is set for the individual area R overlapping the road sign 106. Accordingly, the ADB light distribution pattern 64 includes a dimming area 68 corresponding to the road sign 106. An illuminance value of the dimming area 68 may be "0". For example, a maximum illuminance value of light with which the light source unit 10 is capable of irradiating is set for other individual areas R.

Subsequently, as illustrated in FIG. 4E, under formation of the ADB light distribution pattern 64, the front side of the host vehicle is imaged by the imaging unit 12, and the image data D is obtained. Under the formation of the ADB light distribution pattern 64, the specific illuminance area 66 overlaps the oncoming vehicle 100 and the preceding vehicle 104 which are present in front of the host vehicle, and the dimming area 68 overlaps the road sign 106. Other individual areas R are irradiated with light of illuminance determined by the illuminance setting unit 42. As a result, visibility of a driver of the host vehicle can be improved without giving glare to drivers of the oncoming vehicle 100, the preceding vehicle 104, and the host vehicle.

Figure 4F:
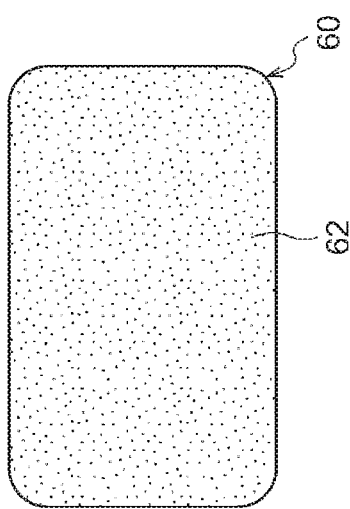

In the ADB control according to the present embodiment, the light source control unit 20 controls the light source unit 10 to periodically form the reference light distribution pattern 60. The illuminance setting unit 42 updates the illuminance value when the new reference detection result is obtained. The illuminance setting unit 42 determines the new light distribution pattern based only on the reference detection result obtained under the formation of the reference light distribution pattern 60. Therefore, as illustrated in FIG. 4F, the illuminance setting unit 42 does not determine the new ADB light distribution pattern 64 based on the image data D obtained under the formation of the ADB light distribution pattern 64, and maintains the illuminance value of each individual area R still as the illuminance value determined based on the previous reference detection result.

A period of forming the reference light distribution pattern 60 can be appropriately set based on results of experiments or simulations in consideration of a load applied to the vehicle lamp system 1, detection accuracy of the target, and the like. The period of forming the reference light distribution pattern 60 can be set based on elapsed time, the number of imaging times of the imaging unit 12, and the like.

Therefore, as illustrated in FIG. 5A, the previously determined ADB light distribution pattern 64 is continuously formed in front of the host vehicle. Thereafter, as illustrated in FIGS. 5B to 5C, the formation of the same ADB light distribution pattern 64 is continued until the next reference light distribution pattern 60 is formed.

When a timing of forming the next reference light distribution pattern 60 is reached, as illustrated in FIG. 5D, the light source control unit 20 controls the light source unit 10 to form the reference light distribution pattern 60. When the reference light distribution pattern 60 is formed from a state where the ADB light distribution pattern 64 has been formed, the light source control unit 20 forms the reference light distribution pattern 60 including the specific illuminance area 66 which has been included in the ADB light distribution pattern 64. Therefore, a part of the reference light distribution pattern 60 includes the specific illuminance area 66 which depends on the illuminance value determined by the illuminance setting unit 42, and a remaining part of the reference light distribution pattern 60 includes the fixed illuminance area 62 which does not depend on the illuminance value determined by the illuminance setting unit 42. When the specific illuminance area 66 is not included in the ADB light distribution pattern 64, the reference light distribution pattern 60 includes only the fixed illuminance area 62.

Subsequently, as illustrated in FIG. 5E, under the formation of the reference light distribution pattern 60, the front side of the host vehicle is imaged by the imaging unit 12, and image data D is obtained. The luminance analysis unit 14 detects the luminance of each individual area R based on the image data D. In the detection result, the light spots 102 derived from the oncoming vehicle 100 and the preceding vehicle 104, and the road sign 106 are detected as a high luminance body. The target analysis unit 16 detects the oncoming vehicle 100 and the preceding vehicle 104 again from the light spots 102 included in the image data D obtained under the formation of the reference light distribution pattern 60. Accordingly, the new reference detection result is obtained. That is, the reference detection result is updated.

Subsequently, as illustrated in FIG. 5F, the illuminance setting unit 42 determines the illuminance value of each individual area R based on the new reference detection result. As a result, the new ADB light distribution pattern 64 is determined. Then, the light source control unit 20 controls the light source unit 10 to form the determined ADB light distribution pattern 64. The illuminance setting unit 42 may determine whether the newly obtained reference detection result is the same as the previous reference detection result, and may maintain the previous illuminance value without updating the illuminance value when the newly obtained reference detection result is the same as the previous reference detection result. When the oncoming vehicle 100 or the preceding vehicle 104 has been detected at a stage of forming the reference light distribution pattern 60, the reference light distribution pattern 60 (see FIG. 4B) formed at the start of ADB control may be the reference light distribution pattern 60 (see FIG. 5D) including the specific illuminance area 66 corresponding to the oncoming vehicle 100 or the preceding vehicle 104 that has been detected.

Glare to be given to the drivers of the oncoming vehicle 100 and the preceding vehicle 104 can be reduced by forming the reference light distribution pattern 60 including the specific illuminance area 66. The illuminance setting unit 42 determines the new ADB light distribution pattern 64 under the formation of the reference light distribution pattern 60. Accordingly, when a position of the oncoming vehicle 100 or the preceding vehicle 104 has been moved after the previous determination of the ADB light distribution pattern 64, the ADB light distribution pattern 64 including the specific illuminance area 66 which matches a position of a movement destination can be formed.

Figure 6:
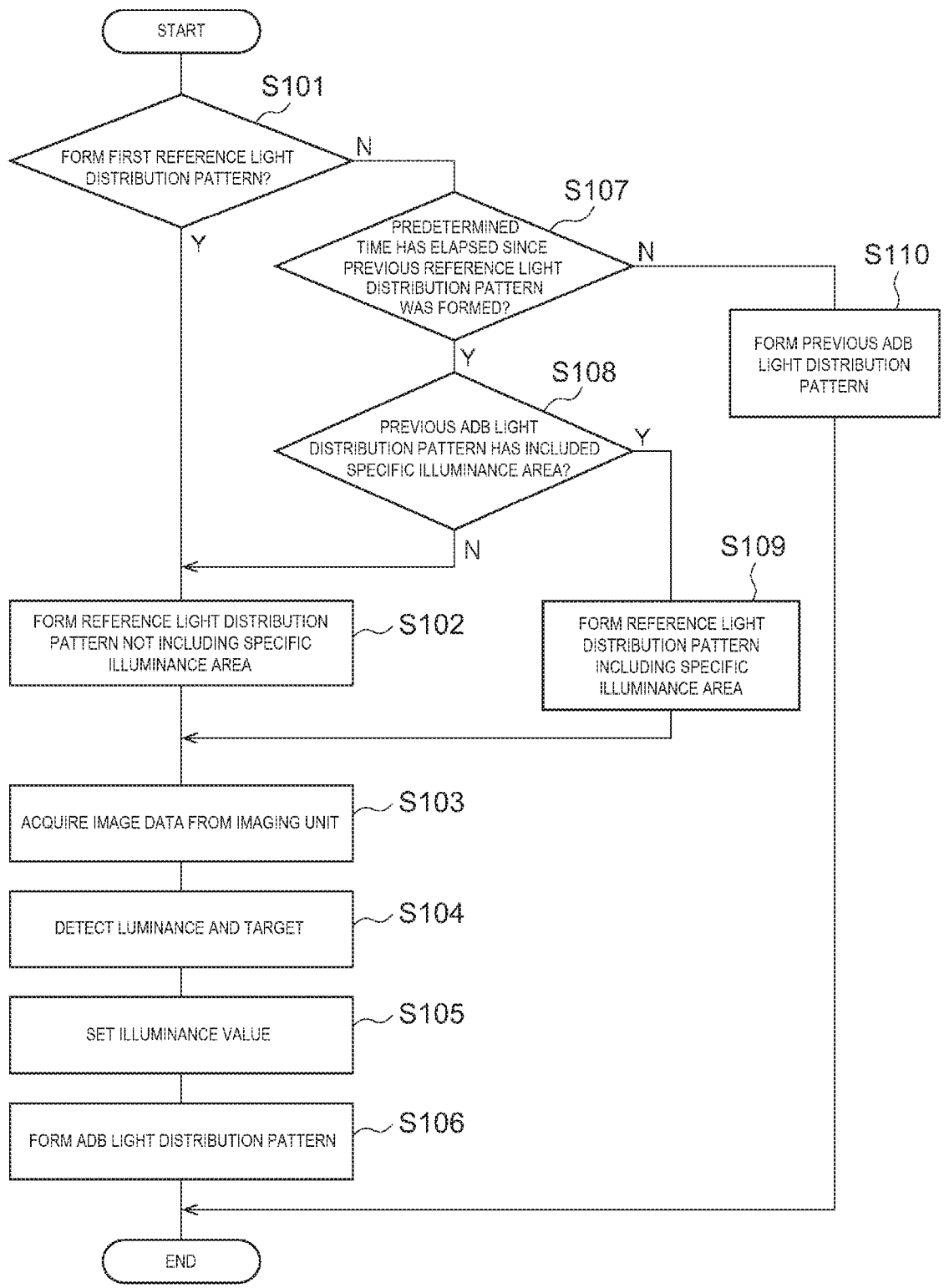
FIG. 6 is a flowchart showing an example of the ADB control executed in the vehicle lamp system according to the embodiment.

FIG. 6 is a flowchart showing an example of the ADB control executed in the vehicle lamp system according to the embodiment. This flow is repeatedly executed at a predetermined timing when an instruction to execute the ADB control is issued by, for example, a light switch (not shown) and when an ignition is turned on, and ends when the instruction to execute the ADB control is canceled (or a stop instruction is issued) or when the ignition is turned off.

The control device 50 determines whether it is a formation timing of the first reference light distribution pattern 60 (S101). Whether the first reference light distribution pattern 60 is formed can be determined based on presence or absence of a formation flag of the reference light distribution pattern 60. When it is the formation timing of the first reference light distribution pattern 60 (Y in S101), the control device 50 controls the light source unit 10 to form the reference light distribution pattern 60 not including the specific illuminance area 66 (S102). The control device 50 generates the formation flag of the reference light distribution pattern 60 and holds the formation flag in the memory.

Subsequently, the image data is acquired from the imaging unit 12 (S103). Then, the control device 50 detects the luminance of each individual area R and the target which is present in front of the host vehicle based on the image data (S104). Subsequently, the control device 50 determines the illuminance value of the light with which each individual area R is irradiated (S105). When the target has been detected in step S104, the control device 50 sets the specific individual area R1, and determines the specific illuminance value for the specific individual area R1. A flag indicating that the ADB light distribution pattern 64 includes the specific illuminance area 66 is generated and stored in the memory. Then, the control device 50 controls the light source unit 10 based on the determined illuminance value, forms the ADB light distribution pattern 64 in front of the host vehicle, and ends the present routine.

If it is not the formation timing of the first reference light distribution pattern 60 (N in S101), the control device 50 determines whether predetermined time has elapsed since the previous reference light distribution pattern 60 was formed (S107). The elapsing of time can be determined based on elapsing of time from a time when the formation flag of the reference light distribution pattern 60 has been generated. When the predetermined time has elapsed (Y in S107), the control device 50 determines whether the previously formed ADB light distribution pattern 64 has included the specific illuminance area 66 (S108). Presence or absence of the specific illuminance area 66 can be determined by presence or absence of a flag indicating that the specific illuminance area 66 is included.

When the previously formed ADB light distribution pattern 64 has not included the specific illuminance area 66 (N in S108), the control device 50 controls the light source unit 10 to form the reference light distribution pattern 60 not including the specific illuminance area 66 (S102). The control device 50 generates the formation flag of the reference light distribution pattern 60 and holds the formation flag in the memory. Thereafter, the processing of steps S103 to S106 is executed, and the present routine ends. When the previously formed ADB light distribution pattern 64 has included the specific illuminance area 66 (Y in S108), the control device 50 controls the light source unit 10 to form the reference light distribution pattern 60 including the specific illuminance area 66 (S109). The control device 50 generates the formation flag of the reference light distribution pattern 60 and holds the formation flag in the memory. Thereafter, the processing of steps S103 to S106 is executed, and the present routine ends.

When the predetermined time has not elapsed since the previous reference light distribution pattern 60 has been formed (N in S107), the control device 50 controls the light source unit 10 to form the previously formed ADB light distribution pattern 64 (S110), and the present routine ends.

As described above, the vehicle lamp system 1 according to the present embodiment includes: an imaging unit 12 configured to image a front side of a host vehicle; a luminance analysis unit 14 configured to detect, based on information obtained from the imaging unit 12, luminance of each of a plurality of individual areas R arranged in front of the host vehicle; an illuminance setting unit 42 configured to determine, based on a detection result of the luminance analysis unit 14, a illuminance value of light with which each individual area R is irradiated; a light source unit 10 capable of independently adjusting the illuminance of the light with which each of the plurality of individual areas R is irradiated; and a light source control unit 20 configured to control the light source unit 10 based on the illuminance value determined by the illuminance setting unit 42.

The light source control unit 20 controls the light source unit 10 to periodically form a reference light distribution pattern 60 including at least a part of a fixed illuminance area 62 which does not depend on the illuminance value determined by the illuminance setting unit 42. The illuminance setting unit 42 determines the illuminance value based on a reference detection result including a detection result of the luminance analysis unit 14 obtained under formation of the reference light distribution pattern 60, and updates the illuminance value when the new reference detection result is obtained.

As described above, the present inventor has found that an accuracy of the ADB control may gradually decrease in the closed loop control in which the camera imaging under the formation of the light distribution pattern by the lamps of the host vehicle and the determination of the light distribution pattern based on the obtained image data are repeated. That is, it is assumed that the reflection object in front of the host vehicle is irradiated with the light. In this case, the reflection object becomes a high luminance body in the image data of the camera. On the other hand, the light distribution pattern including a dimming area is formed at a position corresponding to the reflection object. However, when an angle of view of the camera and a light emission angle of the lamp are deviated, the dimming area is deviated with respect to the reflection object. In the image data obtained in this state, a first part, which is a part of the reflection object, remains at high luminance, and a remaining second part becomes dark.

On the other hand, the light distribution pattern to be formed next includes the dimming area at a position corresponding to the first part remaining at high luminance. In the light distribution pattern to be formed next, the remaining second part is irradiated with the light. However, a formation position of this light distribution pattern is deviated, so that the dimming area to overlap the first part overlaps a part of the second part. As a result, the first part of the reflection object remains at a high luminance, and the second part is divided into a dark part and a high luminance part. Thereafter, when this operation is repeated, an area in which a bright part and the dark part are alternately arranged is enlarged. Therefore, the light distribution pattern to be formed in accordance with a situation in front of the host vehicle gradually and the light distribution pattern actually formed gradually deviate, and a formation accuracy of the light distribution pattern gradually decreases.

In contrast, in the vehicle lamp system 1 according to the present embodiment, the reference light distribution pattern 60 including the fixed illuminance area 62 which does not depend on the illuminance value determined by the illuminance setting unit 42, that is, which does not depend on the image data of the imaging unit 12 is periodically formed, and the ADB light distribution pattern 64 is determined based on the image data obtained under the formation of the reference light distribution pattern 60. Accordingly, even if there is a deviation between the angle of view of the camera and the light emission angle of the lamp, progress of the deviation between the light distribution pattern to be formed and the light distribution pattern actually formed can be prevented by periodically resetting the ADB light distribution pattern 64. Therefore, it is possible to prevent a decrease in the formation accuracy of the light distribution pattern.

In the present embodiment, the previously determined ADB light distribution pattern 64 is maintained until the new ADB light distribution pattern 64 is determined. Accordingly, it is possible to further prevent the deviation between the light distribution pattern to be formed and the light distribution pattern actually formed.

It is possible to prevent a decrease in the accuracy of the ADB control without physically aligning the imaging unit 12 and the light source unit 10 with high accuracy and without performing correction by calculation processing of the image data. Therefore, according to the present embodiment, it is possible to maintain the formation accuracy of the light distribution pattern while reducing complication of the configuration of the vehicle lamp system 1. A formation frequency of the ADB light distribution pattern 64 is reduced, so that a load on the control device 50 can be reduced.

The reflection object is not the self-luminous body, and does not correspond to a target for which the specific individual area R1 is set. Therefore, when the reference light distribution pattern 60 is formed, the reflection object is irradiated with the light emitted from the light source unit 10. In the detection result (the reference detection result) of the luminance analysis unit 14 obtained in this state, the reflection object becomes the high luminance body, so that the reflection object becomes a dimming (light shielding) target when the ADB light distribution pattern 64 is determined. Accordingly, in the detection result of the luminance analysis unit 14 obtained under the subsequent formation of the ADB light distribution pattern 64, the reflection object becomes a low luminance body. That is, the reflection object periodically switches between a state where the host vehicle is irradiated with the light (where the light is reflected toward the host vehicle) and a state where the host vehicle is not irradiated with the light. This switching is performed at a high speed, so that the driver of the host vehicle visually recognizes the reflection object with brightness obtained by averaging brightness at a time of high luminance and brightness at a time of low luminance. Accordingly, the brightness of the reflection object visually recognized by the driver can be adjusted by adjusting the period of forming the reference light distribution pattern 60.

The fixed illuminance area 62 includes any one of at least a part of the low beam light distribution pattern and at least a part of the high beam light distribution pattern. Accordingly, the reference light distribution pattern 60 can be formed using the existing light distribution pattern. Therefore, the vehicle lamp system 1 can be further simplified.

The vehicle lamp system 1 further includes the target analysis unit 16 configured to detect, based on the information obtained from the imaging unit 12, the predetermined target which is present in front of the host vehicle. The illuminance setting unit 42 determines the specific illuminance value for the specific individual area R1 determined in accordance with the position where the target is present. The reference light distribution pattern 60 includes the specific illuminance area 66 formed of the specific illuminance value. That is, the reference light distribution pattern 60, which includes at least a part of the fixed illuminance area 62, includes two types of light distribution pattern. One of the type is the reference light distribution pattern 60 includes entirely of the fixed illuminance area 62. The other one of the type is a part of the reference light distribution pattern 60 includes the specific illuminance area 66 and the remaining part of the reference light distribution pattern 60 includes the fixed illuminance area 62. Accordingly, even under the formation of the reference light distribution pattern 60. The target can be irradiated with the light of the specific illuminance value. Therefore, for example, when the target is the oncoming vehicle 100 or the preceding vehicle 104, glare to be given to the driver of the oncoming vehicle 100 or the preceding vehicle 104 can be reduced by forming the reference light distribution pattern 60.

The embodiment of the present invention has been described above in detail. The above-described embodiment is merely a specific example for carrying out the present invention. The contents of the embodiment do not limit the technical scope of the present invention, and many design changes which are change, addition, deletion, and the like of constituent elements may be made without departing from the spirit of the invention defined in the claims. New embodiments to which design changes have been made have the effects of the combined embodiments and modifications. In the above-described embodiment, the contents that can be design-changed as described above are denoted by the notations which are "the present embodiment", "in the present embodiment", and the like and emphasized, but design changes are allowed even for the contents without these notations. Any combination of the above components is effective as an aspect of the present invention. The hatching in the cross section of the drawing does not limit the material of the hatched target.

In the embodiment, the imaging unit 12 and the control device 50 are provided in the lamp chamber 8, but the imaging unit 12 and the control device 50 may be provided outside the lamp chamber 8 as appropriate. When the high speed camera 36 has the same resolution as the low speed camera 38 or when the target analysis unit 16 has an algorithm capable of performing sufficient target detection at low resolution of the high speed camera 36 even when the resolution remains low, the low speed camera 38 may be omitted. Accordingly, a size of the vehicle lamp system 1 can be reduced. In this case, the target analysis unit 16 detects the target using the image data of the high speed camera 36. The light source unit 10 may include a scanning optical system configured to scan the front side of the host vehicle with light source light or an LED array in which LEDs corresponding to the individual areas R are arranged, instead of the light deflection device 26 which is a DMD. In the embodiment, the target analysis unit 16 detects the oncoming vehicle 100 or the preceding vehicle 104 as the target. However, the luminance analysis unit 14 may detect the oncoming vehicle 100 and the preceding vehicle 104 based on a luminance difference between the oncoming vehicle 100 and the preceding vehicle 104 and surroundings thereof.

The following aspects can also be included in the present invention.

A control device (50) of a vehicle lamp (2), the control device (50) including:

a luminance analysis unit (14) configured to detect, based on information obtained from an imaging unit (12) configured to image a front side of a host vehicle, luminance of each of a plurality of individual areas (R) arranged in front of the host vehicle;

an illuminance setting unit (42) configured to determine, based on a detection result of the luminance analysis unit (14), an illuminance value of light with which each individual area (R) is irradiated; and a light source control unit (20) configured to control a light source unit (10) capable of independently adjusting, based on the illuminance value determined by the illuminance setting unit (42), illuminance of the light with which each individual area (R) is irradiated, in which the light source control unit (20) controls the light source unit (10) to periodically form a reference light distribution pattern (60) including at least a part of a fixed illuminance area (62) which does not depend on the illuminance value determined by the illuminance setting unit (42), and in which the illuminance setting unit (42) determines the illuminance value based on a reference detection result including the detection result of the luminance analysis unit (14) obtained under the formation of the reference light distribution pattern (60), and updates the illuminance value when the new reference detection result is obtained.

A control method of a vehicle lamp (2), the control method including:

a luminance detecting step of detecting, based on information obtained from an imaging unit (12) configured to image a front side of a host vehicle, luminance of each of a plurality of individual areas (R) arranged in front of the host vehicle;

an illuminance setting step of determining, based on the detected luminance, an illuminance value of light with which each individual area (R) is irradiated; and a light source control step of controlling a light source unit (10) capable of independently adjusting, based on the determined illuminance value, illuminance of the light with which each individual area (R) is irradiated, in which the control method further includes a step of periodically forming a reference light distribution pattern (60) including at least a part of a fixed illuminance area (62) which does not depend on the illuminance value determined in the illuminance setting step, and in which, in the illuminance setting step, the illuminance value is determined based on a reference detection result including the detection result of the luminance detecting step obtained under the formation of the reference light distribution pattern (60), and the illuminance value is updated when the new reference detection result is obtained.

The invention claimed is:

1. A vehicle lamp system comprising:
an imaging unit configured to image a front side of a host vehicle;
a luminance analysis unit configured to detect luminance of each of a plurality of individual areas arranged in front of the host vehicle;
an illuminance setting unit configured to determine, based on a detection result of the luminance analysis unit, an illuminance value of light with which each individual area is irradiated;
a light source unit that adjusts illuminance of the light with which each of the plurality of individual areas is irradiated, wherein the illuminance of the light of each of the plurality of individual areas is adjusted independently of the illuminance of the light of other individual areas; and
a light source control unit configured to control the light source unit based on the illuminance value determined by the illuminance setting unit,
wherein the light source control unit controls the light source unit to periodically form a reference light distribution pattern including at least a part of a fixed illuminance area which does not depend on the illuminance value determined by the illuminance setting unit,
wherein the illuminance setting unit determines the illuminance value based on a reference detection result included in detection results of the luminance analysis unit, and updates the illuminance value when the new reference detection result is obtained, and
wherein the reference detection result includes first luminance of each of the plurality of individual areas arranged in front of the host vehicle, and does not include second luminance of each of the plurality of individual areas arranged in front of the host vehicle, the first luminance being detected based on information obtained from the imaging unit while the reference light distribution pattern is formed, the second luminance being detected based on information obtained from the imaging unit while the reference light distribution pattern is not formed.

2. The vehicle lamp system according to claim 1,
wherein the fixed illuminance area includes any one of at least a part of a low beam light distribution pattern and at least a part of a high beam light distribution pattern.

3. The vehicle lamp system according to claim 1, further comprising:
a target analysis unit configured to detect, based on the information obtained from the imaging unit, a predetermined target which is present in front of the host vehicle,
wherein the illuminance setting unit determines a specific illuminance value for a specific individual area determined in accordance with a position where the target is present, and
wherein the reference light distribution pattern includes a specific illuminance area formed of the specific illuminance value.

4. A control device of a vehicle lamp, the control device comprising:
a luminance analysis unit configured to detect luminance of each of a plurality of individual areas arranged in front of a host vehicle;
an illuminance setting unit configured to determine, based on a detection result of the luminance analysis unit, an illuminance value of light with which each individual area is irradiated; and
a light source control unit configured to control a light source unit that adjusts, based on the illuminance value determined by the illuminance setting unit, illuminance of the light with which each individual area is irradiated, wherein the illuminance of the light of each of the plurality of individual areas is adjusted independently of the illuminance of the light of other individual areas,
wherein the light source control unit controls the light source unit to periodically form a reference light distribution pattern including at least a part of a fixed illuminance area which does not depend on the illuminance value determined by the illuminance setting unit,
wherein the illuminance setting unit determines the illuminance value based on a reference detection result included in detection results of the luminance analysis unit, and updates the illuminance value when the new reference detection result is obtained, and
wherein the reference detection result includes first luminance of each of the plurality of individual areas arranged in front of the host vehicle, and does not include second luminance of each of the plurality of individual areas arranged in front of the host vehicle, the first luminance being detected while the reference light distribution pattern is formed, the second luminance being detected while the reference light distribution pattern is not formed.

5. A control method of a vehicle lamp, the control method comprising:
a luminance detecting step of detecting luminance of each of a plurality of individual areas arranged in front of a host vehicle;
an illuminance setting step of determining, based on the detected luminance, an illuminance value of light with which each individual area is irradiated; and
a light source control step of controlling a light source unit that adjusts, based on the determined illuminance value, illuminance of the light with which each individual area is irradiated, wherein the illuminance of the light of each of the plurality of individual areas is adjusted independently of the illuminance of the light of other individual areas,
wherein the control method further includes a step of periodically forming a reference light distribution pattern including at least a part of a fixed illuminance area which does not depend on the illuminance value determined in the illuminance setting step,
wherein, in the illuminance setting step, the illuminance value is determined based on a reference detection result included in detection results of luminance detecting step, and the illuminance value is updated when the new reference detection result is obtained, and
wherein the reference detection result includes first luminance of each of the plurality of individual areas arranged in front of the host vehicle, and does not include second luminance of each of the plurality of individual areas arranged in front of the host vehicle, the first luminance being detected while the reference light distribution pattern is formed, the second luminance being detected while the reference light distribution pattern is not formed.

6. The vehicle lamp system according to claim 2, further comprising:
a target analysis unit configured to detect, based on the information obtained from the imaging unit, a predetermined target which is present in front of the host vehicle,
wherein the illuminance setting unit determines a specific illuminance value for a specific individual area determined in accordance with a position where the target is present, and
wherein the reference light distribution pattern includes a specific illuminance area formed of the specific illuminance value.

* * * * *

UNITED STATES PATENT AND TRADEMARK OFFICE
CERTIFICATE OF CORRECTION

PATENT NO. : 10,919,438 B2
APPLICATION NO. : 16/727473
DATED : February 16, 2021
INVENTOR(S) : Takehito Iriba Page 1 of 1

It is certified that error appears in the above-identified patent and that said Letters Patent is hereby corrected as shown below:

On the Title Page

Item (56), right column, "FOREIGN PATENT DOCUMENTS" section, Line 1, the reference reading "JP 2012-88224 A 5/2012" should be changed to --JP 2016-88224 A 5/2016--.

In the Specification

Column 1, Line 32, the reference reading "N-A-2012-088224" should be changed to --JP-A-2016-088224--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*